May 28, 1968 C. P. BOEGLI ET AL 3,385,267

ANIMAL DRINKING VALVE

Filed Nov. 25, 1966

INVENTORS
CHARLES P. BOEGLI
DELBERT STEIGERWALD
BY
J. Warren Kinney Jr.
ATTORNEY.

United States Patent Office 3,385,267
Patented May 28, 1968

3,385,267
ANIMAL DRINKING VALVE
Charles P. Boegli, Woodlawn, and Delbert Steigerwald, Terrace Park, Ohio, assignor to The Fieldstone Corporation, Cincinnati, Ohio, a corporation of Ohio
Filed Nov. 25, 1966, Ser. No. 597,089
10 Claims. (Cl. 119—72.5)

ABSTRACT OF THE DISCLOSURE

The low pressure drinking valve includes a cap which has an axial passageway therethrough defining a cylindrical passage, a frusto-conical seating surface, and a cylindrical supply chamber joined to the flared end of said seating surface. A plunger operates in the passageway. The plunger has a cylindrical portion extending loosely through the cylindrical passageway and a substantially hemispherical soft portion forming a valve head cooperating with said frusto-conical seating surface. The valve is opened against said low pressure upon activation of the cylindrical portion. The frusto-conical surface may have a plurality of spaced concentric ridges extending circumferentially therearound to coact with the surface of the valve head to provide a more effective seal.

---

The present invention relates to an animal drinking valve, and more particularly to a non-leaking, low water pressure, animal-activated drinking fount.

It is well known in the art that animal-activated drinking valves which operate in a low-pressure water system are prone to leakage because of the low pressures employed to seat the valve in the closed position. The low pressures are inherently necessary to provide a system of sufficiently low resistance that the valve can be opened by small animals (e.g., rats, mice, guinea pigs, hamsters, rabbits, poultry) by manipulating the contact member with some part of their head, and which does not produce a flow of water greater than can be consumed by the animal. It is also well known that water leaking from these valves can produce unsanitary conditions—an undesirable situation in the scientific or commercial raising of small animals, as well as being wasteful of water.

In the past, attempts have been made to overcome these objections in various ways. U.S. Patent No. 3,008,-451 discloses a valve employing combinations of an elastomeric valve head with a slippery plastic-surface valve bore, by which combination the frictional force resisting opening of the valve by an animal is supposed to be substantially reduced, thereby permitting the valve to seal itself more tightly against the flow of water without unduly increasing the force the animal must exert to open it. In U.S. Patent 3,215,119, however, it is noted that the employment of such materials does not overcome the aforementioned objections, and that valves made according to the art of U.S. Patent 3,008,451 must be mounted vertically with the dispensing opening downward to assure leakproof operation, in which orientation the weight of the valve stem and valve head assists in closing the valve. Attempts to mount the valve vertically, however, resulted in serious installation problems since large openings were required in animal cages to clear the vertical structure. U.S. Patent No. 3,215,119 attempts to overcome this objection by providing a reasonably compact structure maintaining the valve in a vertical position with the dispensing opening downward.

The employment of a plastic-surfaced valve bore also results in a structure composed of an undesirably large number of small components which are easily misplaced or lost when the valve is disassembled for service or cleaning.

The animal drinking valve of the present invention includes a valve cap having a valve bore with an internal frusto-conical seat. A valve plunger comprises an animal contact member loosely fitting in and projecting from the outer end of the valve bore, the valve plunger including a relatively soft valve head which is fitted loosely within a chamber adjacent the valve seat in the valve cap. This valve head is normally urged into contact with the valve seat by the force of the water acting thereon, the valve being opened by an animal's forcing the plunger inwardly into the valve cap by manipulating the animal contact member with some part of its head. A valve body is adapted to receive the valve cap and is so constructed that upon assembly with the valve cap, it prevents the valve plunger from moving inwardly sufficiently to become disengaged from the valve cap. The valve body thereby limits inward movement of the plunger, and the valve body is also provided with a passageway for conveying water from a suitable source to the aforementioned valve cap.

The term "loosely fitting" as applied to the valve head and animal contact member as employed herein denotes sufficient clearance between the parts to permit water to flow therebetween.

The arrangement of the present invention provides a trouble-free, low water pressure, animal-activated drinking valve which will not clog or leak after long use and which is readily adaptable for use with all types of small animals capable of self-watering. The valve is easily maintained and repaired and may be completely disassembled for cleaning and service, the parts being formed of materials that can be routinely sterilized by autoclaving.

A particular advantage of the valve of the present invention is the fact that it will not leak when closed irrespective of whether it is mounted in a horizontal position, a vertical position or in any orientation between these limits.

In actual practice, the relatively soft valve head deforms under the force exerted by the water thereon when in its closed sealing position. This deformation can be utilized to improve the sealing obtained between the valve head and the valve seat by machining into the seat a series of fine spaced grooves circumferentially spaced from one another to define a plurality of circumferential ridges which cooperate with the soft valve head to form a series of narrow annuli of areas of contact of high pressure between the valve head and the valve seat whereby the sealing force is effectively increased without adversely affecting the force required to open the valve. In this manner, a much better seal is provided than is obtained with a smooth valve seat without substantially increasing the force required to open the valve.

The valve seat is of substantially frusto-conical configuration and it has been found that the tendency of the valve to resist leaking depends on the included angle of the frusto-conical seat and not upon the materials of construction thereof. By choosing the included angle of the seat within a certain critical predetermined range, it is possible to construct a valve employing a metal seat for which the opening force is only slightly greater than the more complex structures heretofore employed using other special materials for the seat.

An object of the present invention is to provide a new and novel animal drinking valve which provides trouble-free, low water pressure, animal-activated operation; wherein the valve does not tend to clog or leak after long use; and further wherein the valve is readily adaptable for use with all types of small animals capable of self-watering.

Another object of the invention is the provision of an animal drinking valve which is easily maintained and repaired; which can be completely disassembled for cleaning and services; which is constructed of materials that can be routinely sterilized by autoclaving; and further wherein the valve does not leak irrespective of whether it is mounted in a horizontal position, a vertical position or any orientation between these limits.

Still another object of the invention is to provide an animal drinking valve wherein the sealing force is effectively increased without adversely affecting the force required to open the valve.

Yet another object of the invention is the provision of an animal drinking valve employing a metal seat for which the opening force is only slightly greater than more complex structures employing other types of special material for the seat.

A further object of the invention is to provide an animal drinking valve including means for limiting the inward movement of the plunger, and wherein the valve is quite simple and inexpensive in construction, yet is efficient and reliable in use.

Other objects and many attendant advantages of the invention will become more apparent when considered in connection with the specification and accompanying drawings, wherein.

Figure 1:
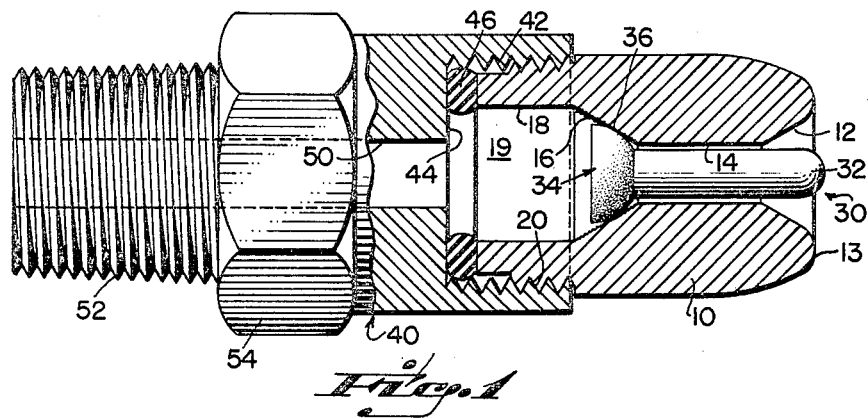
FIG. 1 is an elevation partly in vertical section of an animal drinking valve according to the present invention.
Figure 2:
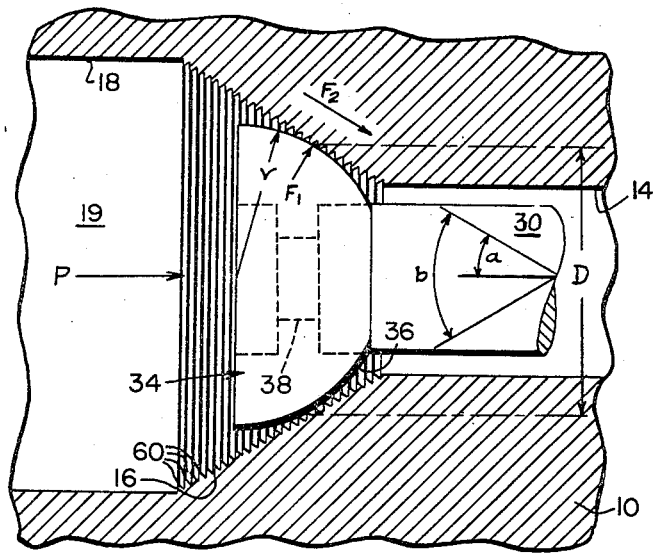
FIG. 2 is an enlarged view of a portion of the structure shown in FIG. 1.
Figure 3:
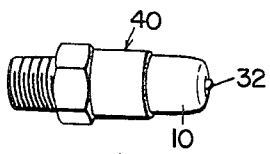
FIG. 3 is a perspective view of a valve employed with rats.

Referring now to the drawing wherein like reference characters designate corresponding parts throughout the several views, FIGS. 1–3 inclusive illustrate a first form of the invention wherein a valve cap 10 is formed of a suitable corrosion resistant material such as brass, stainless steel, or aluminum and the like. This valve cap has a passageway extending axially therethrough, this passageway including a generally frusto-conically shaped portion 12 opening through the outer end 13 of the valve cap. Portion 12 of the passageway joins with a generally cylindrical bore portion 14 which in turn joins with a substantially frusto-conically shaped valve seat 16 the detailed construction of which is described hereinafter. The valve seat in turn joins with a substantially cylindrical wall portion 18 defining a chamber 19 therewithin. The inner end portion 20 of the valve cap is provided with threads on the outer surface thereof so that it may be threaded within the valve body hereinafter described.

A plunger indicated generally by reference numeral 30 includes an animal contact portion 32 and a relatively soft valve head 34. This valve head may be formed of a suitable elastomeric material such as 36 Duro Buna N rubber or the like which is adapted to deform under the force of the water pressure applied thereto.

The valve head includes a curved sealing surface 36 which defines a portion of a spherical surface. As illustrated, the valve head is generally hemispherical in configuration.

As seen particularly in FIG. 2, the animal contact member, which may be formed of a suitable metallic substance such as stainless steel or the like, is provided with a peripheral groove 38 formed at the inner end thereof, this peripheral groove assisting in holding the valve head 34 in operative position upon the animal contact member. The valve head may additionally be bonded to the animal contact member. In any event, the valve head is suitably fastened to the animal contact member to prevent removal thereof by the forces encountered in normal use of the apparatus.

The animal contact member 32 is loosely received within the bore 14 of the valve cap, and the valve head is of such a dimension as to be loosely received within the chamber 19 so that it can move back and forth therewithin, and yet at the same time it is of substantially greater dimension that the bore 14 formed in the valve cap.

A valve body indicated generally by reference numeral 40 may be formed of a material similar to the valve cap 10 and includes a recess at one end thereof, this recess being defined by a threaded side wall portion 42 and a bottom wall portion 44. The threaded side wall portion 42 is threadedly connected to the inner end of a valve cap, and a sealing gasket 46 formed of rubber or the like of annular configuration is compressed between the inner end of the valve cap and the bottom wall 44 of the recess in the valve body.

A substantially axially extending bore or passageway 50 is formed longitudinally through the valve body 40 and opens through the wall portion 44. The valve body is provided with a threaded end portion 52 for connection with any suitable source of water under pressure, an integral hex head portion 54 being provided at an intermediate point on the valve body so that the valve body can be readily manipulated by a wrench or similar tool.

The dimension of the valve head 34 is substantially greater than that of the passageway 50 formed in the valve body, and inner movement of the plunger is limited by interengagement of the valve head with the surface 44 of the valve body, the components being so dimensioned that this interengagement will prevent the animal contact member 32 from leaving the bore portion 14 of the valve cap upon inward movement of the plunger. The animal contact member 32 is adapted to be urged inwardly by contact with an animal so as to unseat the valve head from the frusto-conical valve seat whereby water will flow freely around the valve head and the animal contact member through the outer end of the valve cap.

As seen particularly in FIG. 2, the frusto-conically shaped valve seat 16 is machined so as to provide a plurality of concentric grooves therein which thereby define a plurality of spaced circumferential relatively sharp concentric ridges 60 which extend circumferentially about the valve seat to provide a plurality of contact points for the valve head in closed position. These circumferential ridges are spaced from one another so as to define a surface having a roughness of from about 40 to 80 microinches root mean square. tI has been found that with this particular critical limit of roughness, the sealing force is effectively increased without adversely affecting the force required to open the valve.

It has been additionally found that by providing a frusto-conical valve seat having an included angle of between about 50 and 90 degrees, it is possible to construct a valve employing a metal seat wherein the opening force is only slightly greater than that of more complex structures employing special seat materials. As illustrated, the frusto-conical seat defines an angle $b$ of approximately 60 degrees.

Referring now to FIG. 2, the dimension $r$ is the radius of the hemispherical valve head, $a$ is the half-angle of the conical valve seat, D is the diameter of the circle of contact between the valve head and the valve seat, the valve head being assumed not to deform significantly under the water pressure, and P is the pressure of the water. The force required to dislodge the valve head from the valve seat is the sum of a first force exerted by the water on the valve head, and a second frictional force between the valve head and the valve seat. The first force is equal to the product of the pressure of the water P and the effective area of the valve head $\pi r^2 \cos^2 a$. Were it not for the effects of friction, this would be the force required to open the valve.

At the instant of opening, the total frictional force is equal to the force $F_1$ which the valve head exerts perpendicularly upon the valve seat, multiplied by the coefficient of friction $f$ between the valve head and the valve seat. The perpendicular force is determined by the force exerted by the water and the angle of the seat, being equal to $P\pi r^2 \cos^2 a \sin a$, whereupon the total frictional force $F_2$ is equal to $fP\pi r^2 \cos^2 a \sin a$. Upon opening the valve, however, only that portion of the frictional force opposing the inward motion of the stem appears as resistance, the aforesaid second frictional force thus equalling the total frictional force $F_2$ times the cosine of the angle $a$, or $\pi fPr^2 \cos^3 a \sin a$.

The total force required to open the valve is therefore $\pi r^2 P \cos^2 a(f/2 \sin 2a+1)$. The force tending to seal the valve head to the valve seat and thus to prevent the passage of water between the valve head and the valve seat, on the other hand, is the aforementioned perpendicular force, $\pi r^2 P \cos a (1/2 \sin 2a)$.

Valves of similar design having different seat angles can be compared by considering the product $\pi r^2 P$ is unity, whereupon in relative terms the opening force of the valve is $\cos^2 a(f/2 \sin2a+1)$ and the force sealing against the passage of water is $\cos a(1/2 \sin a)$. The sealing force goes through a broad maximum at a half-angle of about 35 degrees, while the opening force depends on the materials of which the valve head and valve seat are made. It is seen that while the employment of various materials has an effect on the force required to open the valve, the tendency of the valve to resist leaking depends on the angle of the conical seat and not upon the materials of construction. As mentioned previously, the included angle of the frusto-conical seat should be between about 50 and 90 degrees to obtain the desired results according to the present invention.

By employing a valve head including a sealing surface defining a portion of a spherical surface, the forces required to open and seal the valve are not affected by small rotations of the valve head against the valve seat. The need for a close fit between the animal contact member and the bore of the valve cap is also eliminated along with the tendency toward clogging with debris and corrosion products which characterize valves in which the clearances have been made small to preserve the alignment of the valve head.

Although the valve body 40 has been illustrated as a simple one-piece configuration, it will be appreciated that it can be of any desired shape and may be formed of any number of parts if so desired.

FIGURE 3 is a perspective view of the structure shown in FIGS. 1 and 2 wherein the outer rounded end of the animal contact member projects only slightly beyond the outer end of the valve cap when the valve head is seated on the valve seat. This particular arrangement is designed for use with rats.

Figure 4:
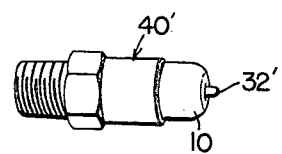
FIG. 4 is a perspective view of a valve employed with rabbits.

Turning now to FIG. 4, a modification is illustrated which is especially designed for use with rabbits and primates. In this form of the invention, the outer end of the animal contact member 32' extends a substantially greater distance beyond the outer end of the valve cap 10' than in the previously described modification. It will be understood that the details of construction of this form of the invention are identical with that previously described except for the fact that the dimension of the cap 10' longitudinally thereof may be reduced, and the dimension of the animal contact member 32' may be increased if desired so as to arrive at the relative relationship in the sealed position as shown in FIG. 4. The body means 40' is of identical construction to the body means 40 previously discussed.

Figure 5:
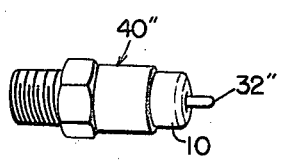
FIG. 5 is a perspective view of a valve employed with mice.

Turning now to FIG. 5, a still further modification is illustrated which is adapted for use with mice. Here again, similar components have been given the same reference numerals double primed as employed in the description of the modification shown in FIGS. 1–3. The components are again of identical construction except for the relative dimensions thereof. The valve cap 10'' may be further shortened as compared with the valve cap 10', and if so desired, the animal contact member 32'' may be lengthened as compared with the animal contact member 32' so as to arrive at the relative relationship shown in FIG. 5 wherein the outer end of the animal contact member extends a very substantial distance beyond the outer end of the valve cap 10''.

It will be understood that in the modification shown in FIGS. 4 and 5, the relative relationship of the outer end of the animal contact member with respect to the outer end of the valve cap may be accomplished either by shortening the longitudinal dimension of the valve cap, or by lengthening the longitudinal dimension of the animal contact member, or by a combination of both of these factors.

It is apparent from the foregoing that there is provided according to the present invention a new and novel animal drinking valve which provides a trouble-free, low water pressure, animal activated drinking valve which does not tend to clog or leak after long use and which is readily adaptable for use with all types of small animals capable of self-watering. The valve is easily maintained and repaired and can be completely disassembled for cleaning and service, and further is constructed of materials that can be routinely sterilized by autoclaving. The valve does not leak when closed irrespective of whether it is mounted in the horizontal or vertical position or any orientation between these limits. The sealing force of the valve is effectively increased without adversely affecting the force required to open the valve, and a metal seat may be employed wherein the opening force is only slightly greater than the more complex structures heretofore employed using special materials for the valve seat. Means is provided for limiting the inward movement of the plunger, and the apparatus is quite simple and inexpensive in construction, yet is quite efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. An animal activated low water pressure drinking valve comprising, in combination a cap having a substantially axial passageway formed therethrough and defining a valve seat of frusto-conical configuration and a chamber adjacent said valve seat, a plunger comprising an animal contact member and a relatively soft valve head including a smooth curved seating surface, said animal contact member fitting loosely within said passageway of said cap, said valve head fitting loosely within said chamber of said cap and being free for seating of said seating surface upon said valve seat or to be moved bodily away from said seat by force exerted on the outer end of said plunger, a body adapted at one end for connection to a water reservoir, said body being connected at the other end thereof to said cap, said body having a substantially axial passageway formed therethrough for transmission of water from a reservoir to said cap, said last-mentioned passageway being of a diameter smaller than the diameter of said valve head, said body having a surface, said passageway through said body opening through said surface, said surface being positioned for engagement by said valve head for limiting the inward movement of said animal contact member to retain the animal contact member within said passageway of said cap, integral means formed in said frusto-conical valve seat providing a plurality of contact points with said valve head when in seated position.

2. An animal activated low water pressure drinking valve, comprising in combination: a cap having a substantially axial passageway formed therethrough and terminating in an outer end and an inner end, the inner end being flared to provide a substantially frusto-conical valve seat and an adjacent enlarged inner chamber; a plunger loosely reciprocable in the passageway and having an animal contacting outer end exposed at the outer end of the passageway; a relatively soft valve head fixed upon the inner end of the plunger and having a part-spherical surface to engage and seat upon the frusto-conical valve seat, said valve head being movable with the plunger away from the valve seat and into the enlarged inner chamber with substantial lateral clearance; a longitudinally bored valve body adapted at one end for connection to a water reservoir, said body being detachably connected at the other end thereof to said cap, with the bore of said body member in fluid communication with said enlarged inner chamber of the cap; the frusto-conical valve seat being roughened by means of a multiplicity of alternate fine grooves and sharp ridges concentric with the axis of the passageway containing the plunger, thereby to provide a series of individual high-pressure contact annuli against which the soft spherical valve head may seat in response to pressure of water entering the chamber of the cap.

3. The valve as specified by claim 2, wherein the multiplicity of fine grooves and sharp ridges define a seating surface having a roughness of from about 40 to 80 microinches R.M.S.

4. The valve as specified by claim 3, wherein the frusto-conical valve seat defines an included angle between approximately 50 and 90 degrees.

5. The valve as specified by claim 2, wherein the frusto-conical valve seat defines an included angle between approximately 50 and 90 degrees.

6. The valve as specified by claim 2, wherein the valve head is formed of an elastomeric material having a hardness of about 20 to 40 Shore A Durometer.

7. The valve as specified by claim 3, wherein the frusto-conical valve seat defines an included angle between approximately 50 and 90 degrees, and has a roughness ranging between about 40 and 80 microinches R.M.S.; and wherein the soft valve head ranges between about 20 and 80 Shore A Durometer hardness.

8. The valve as specified by claim 7, wherein is included means to limit movement of the valve head away from the valve seat, to preclude displacement of the plunger from its supporting passageway.

9. An animal activated low water pressure drinking valve comprising, in combination a cap having a substantially axial passageway formed therethrough and defining a valve seat of frusto-conical configuration and a chamber adjacent said valve seat, a plunger comprising an animal contact member and a relatively soft valve head including a smooth curved seating surface, said animal contact member fitting loosely within said passageway of said cap, said valve head fitting loosely within said chamber of said cap and being free for seating of said seating surface upon said valve seat or to be moved bodily away from said seat by force exerted on the outer end of said plunger, a body adapted at one end for connection to a water reservoir, said body being connected at the other end thereof to said cap, said body having a substantially axial passageway formed therethrough for transmission of water from a reservoir to said cap, said last-mentioned passageway being of a diameter smaller than the diameter of said valve head, said body having a surface, said passageway through said body opening through said surface, said surface being positioned for engagement by said valve head for limiting the inward movement of said animal contact member to retain the animal contact member within said passageway of said cap, integral means formed in said frusto-conical valve seat providing a plurality of contact points with said valve head when in seated position, said integral means being a plurality of spaced ridges extending circumferentially about the valve seat, and said ridges defining a surface having a roughness of from about 40 to 80 microinches R.M.S.

10. An animal activated low water pressure drinking valve comprising, in combination a cap having a substantially axial passageway formed therethrough and defining a valve sat of frusto-conical configuration and a chamber adjacent said valve seat, a plunger comprising an animal contact member and a relatively soft valve head including a smooth curved seating surface, said animal contact member fitting loosely within said passageway of said cap, said valve head fitting loosely within said chamber of said cap and being free for seating of said seating surface upon said valve seat or to be moved bodily away from said seat by force exerted on the outer end of said plunger, a body adapted at one end for connection to a water reservoir, said body being connected at the other end thereof to said cap, said body having a substantially axial passageway formed therethrough for transmission of water from a reservoir to said cap, said last-mentioned passageway being of a diameter smaller than the diameter of said valve head, said body having a surface, said passageway through said body opening through said surface, said surface being positioned for engagement by said valve head for limiting the inward movement of said animal contact member to retain the animal contact member within said passageway of said cap, integral means formed in said frusto-conical valve seat providing a plurality of contact points with said valve head when in seated position, said valve seat of frusto-conical configuration defining an included angle between approximately 50 to 90 degrees, said integral means being a plurality of spaced concentric ridges extending circumferentially therearound and defining a surface having a roughness of from about 40 to 80 microinches R.M.S.

References Cited

UNITED STATES PATENTS

| | | | |
|---|---|---|---|
| 2,489,623 | 11/1949 | Delany | 251—333 X |
| 2,541,369 | 2/1951 | Kofford | 119—72.5 |
| 3,008,451 | 11/1961 | Curry | 119—72.5 |
| 3,128,745 | 4/1964 | Alter | 119—75 |
| 3,215,119 | 11/1965 | Graham | 119—75 |

HUGH R. CHAMBLEE, *Primary Examiner.*